US005884852A

United States Patent [19]

Balmer

[11] Patent Number: 5,884,852

[45] Date of Patent: Mar. 23, 1999

[54] AGRICULTURAL VEHICLE WITH SPRING SUSPENSION OF A BOOM

[76] Inventor: Charles Balmer, Box 100, Elie, Manitoba, Canada, R0H 0H0

[21] Appl. No.: 951,004

[22] Filed: Oct. 15, 1997

[51] Int. Cl.[6] .......... A01C 3/06

[52] U.S. Cl. .......... 239/654; 239/655; 239/159; 248/654

[58] Field of Search .......... 239/159, 163, 239/172, 654, 655, 664, 689; 248/654

[56] References Cited

U.S. PATENT DOCUMENTS

| | | | |
|---|---|---|---|
| 3,357,642 | 12/1967 | Horton | 239/159 |
| 3,544,009 | 12/1970 | Schlueter | 239/159 |
| 4,121,774 | 10/1978 | Van Der Lely et al. | 239/664 |
| 4,441,655 | 4/1984 | Blumhardt | 239/163 |
| 4,744,520 | 5/1988 | Widmer | 239/654 |
| 4,790,484 | 12/1988 | Wall | 239/655 |
| 5,052,627 | 10/1991 | Balmer | 239/655 |
| 5,485,962 | 1/1996 | Moss | 239/655 |

OTHER PUBLICATIONS

Brochure—Lor* Al—Air–Max (4 pages) (Nov. 1996).

*Primary Examiner*—Andres Kashnikow
*Assistant Examiner*—Lisa Ann Douglas
*Attorney, Agent, or Firm*—Adrian D. Battison; Murray E. Thrift

[57] ABSTRACT

A suspension system for a boom of an agricultural particulate material distribution system comprises an inclined strut extending from the boom upwardly and inwardly to a suspension element at the tank. The suspension element comprises a plate attached to the rear wall of the tank and projecting outwardly to the side of the tank on which is mounted a pivot lever having a lower end attached to the plate and an upper end carrying a swivel for attachment to the strut. A gas bag spring is located in a hole in the plate so as to accommodate shock loads applied to the lever from the boom. A self leveling switch increases and decreases pressure in the gas bag spring to maintain a required orientation of the boom and to move the boom to a raised position for avoiding obstacles and for folding.

18 Claims, 5 Drawing Sheets

AIR SUPPLY

AGRICULTURAL VEHICLE WITH SPRING SUSPENSION OF A BOOM

The invention relates to an agricultural vehicle of the type for spreading particulate material having a center vehicle section generally including a tank for transporting the particulate material, a pair of booms each extending out to a respective side of the vehicle and including a plurality of spaced discharge nozzles and a suspension arrangement for suspending each boom relative to the center vehicle section for upward and downward resilient suspension movements.

BACKGROUND OF THE INVENTION

Many machines of this type have a boom which is in effect substantially fixed relative to the center vehicle section without the possibility of suspension movements. This arrangement however severely limits the length of the boom which is available and the speed of operation of the machine. Attempts have been made to provide an improved suspension arrangement which allows an increase in boom length and/or an increase in vehicle speed.

One solution for this problem is to provide significantly improved suspension for the center vehicle section so that the center vehicle section moves upwardly and downwardly at a relatively slow rate in response to changing the ground level thus reducing the shock loading to the boom. This technique is currently being used widely on liquid sprayers.

However in machines for spreading particulate material, the use of suspension of the vehicle is undesirable to allow increased loads and the only suspension is that provided by large "floater" tires.

As shown in U.S. Pat. No. 5,052,627 issued Oct. 1, 1991 of the present inventor and a brochure showing a commercial arrangement of the patented machine manufactured by Ag-Chem, an arrangement is provided in which each boom is individually pivotally mounted on the center vehicle section for upward and downward movement about a horizontal axis parallel to the direction of movement of the vehicle. Each boom is supported by an elongate cable having an inner end attached to the center section at a height above the boom downwardly and outwardly to a position on the boom spaced from the center section so as to communicate the loading from the boom upwardly and inwardly to the center section. Although the patent does not show the coupling of the support member to the vehicle, this is effected in the commercial machine by a generally horizontal sway bar connected to the center section by a pair of pivotal links which interconnects the two booms and provides suspension movement by swaying back and forth across the vehicle. This arrangement provides very little suspension in the vertical direction but simply allows the boom to remain at a required height despite tilting of the center vehicle section in a side-to-side direction. One problem with this arrangement is the difficulty of accommodating the sway bar at the tank.

The height of the boom in this arrangement is controlled by actuating a cylinder which is connected in the inclined support member so it can be moved in to raise the outer end of the boom and let out to lower the outer end of the boom. This arrangement also has the disadvantage that when the boom is moved to a folded transport position, the height of the boom can be different on different occasions so that the boom moves to different positions when folded and can miss the intended locking position.

Simple tension springs in the inclined cable do not operate satisfactorily since the springs do not absorb energy so that the booms, after a shockload, continue to oscillate and thus convert the single shock into a series of repeated smaller shocks which are equally damaging to the boom structure.

Another technique used on a liquid sprayer which has been proposed is that of mounting the two booms for common vertical movement on a slide arrangement which allows vertical suspension sliding movement of the booms relative to the vehicle. A gas bag spring operating in the vertical direction between the sliding boom assembly and the center section provides resilience for the suspension movement of the booms.

The demands of increased vehicle capacity, increased vehicle speed and increased spreading width have significantly increased loads on the booms so that breakage and damage to booms has become a limiting factor in the operation of such machines.

SUMMARY OF THE INVENTION

It is one object of the present invention, therefore, to provide an improved boom suspension system for a machine for spreading particulate materials.

According to one aspect of the invention there is provided a An agricultural machine for spreading particulate material across the ground comprising:

a center section including a tank for the material; and arranged for movement in a working direction across ground to receive the material;

a pair of booms each mounted on the center section so as to extend from the center section outwardly to a respective side of the center section, each boom having a plurality of material transportation pipes each having at least one discharge opening arranged so that the discharge openings are at spaced positions along the length of the boom;

a fan for generating an air flow through the pipes and a metering device for transferring the material from the tank to the pipes for discharge over the ground;

each boom being supported separately on the center section by:

an inner pivot member defining a horizontal pivot axis substantially at right angles to the boom allowing upward and downward pivoting movement of an outer end of the boom relative to the center section; and an inclined support member having an inner end at the center section at a height above the boom and at an outer end connected to the boom at a position thereon spaced outwardly from the center vehicle section such that weight from the boom is transmitted to the center section through the support member; and a guide assembly guiding movement of the inner end of the support member relative to the center section in a direction generally longitudinal of the support member to allow said pivoting movement;

a compressed gas bag spring arranged so as to apply a spring force to the support member in a direction tending to raise the boom so as to provide resilient suspension movement of the boom.

Preferably there is provided means for changing a gas pressure inside the gas bag spring so as to raise and lower a height of an outer end of the boom relative to the center vehicle section.

Preferably there is provided a self leveling switch responsive to changes in angle and to adjust the gas pressure in the gas bag spring to tend to maintain the angle of the boom relative to the center section at a pre-determined operating height of the boom value while the gas bag spring allows said suspension movements of the boom relative to the center vehicle section.

Preferably there is provided a manually operable switch and an actuator arranged so as to effect a change in the gas pressure in the gas bag spring to raise the boom from a pre-determined operating height to a raised height.

Preferably there is provided a manually operable switch and an actuator responsive to the switch for moving the self-leveling switch to raise the boom from a predetermined operating height to a raised height.

Preferably there is provided at least one shock absorber arranged so as to operate generally in parallel to the gas bag spring for damping said resilient suspension movements.

Preferably the support member comprises at least one substantially rigid strut such that the strut is arranged to communicate forces to the boom from the center vehicle section both in tension and compression.

Preferably there is provided means for changing a gas pressure inside the gas bag spring so as to raise and lower a height of an outer end of the boom relative to the center section from a pre-determined operating height to a raised height and wherein the strut is of substantially constant length such that the adjustment of the height of the boom is effected by only changing said gas pressure.

Preferably the guide assembly includes a first member connected to the center section and a lever pivotally mounted at a first end of the lever on the first member and a second end connected to the support member.

Preferably the gas bag spring is connected between the lever and the first member.

Preferably the gas bag spring is located at a position part way along the lever between the first end and the second end.

Preferably the lever is pivotal about an axis parallel to said horizontal pivot axis and stands generally upwardly with the pivot connection at the lower end and the support member connected to the upper end.

Preferably the first member defines a vertical guide surface against which the lever slides.

Preferably the first member comprises a substantially vertical support plate attached to and extending outwardly to one side of the tank and wherein the lever is mounted for pivotal movement about a horizontal axis at right angles to the support plate.

Preferably the support plate has an opening therein with the gas bag spring located in the opening with one end attached to an end engagement plate mounted on the support plate at right angles to the support plate.

Preferably the support member is connected to the lever for pivotal movement about an axis generally longitudinal of the lever for movement of the boom to a folded position.

Preferably the first member and the lever are fixed to the center section to remain extending to one side of the center section while the boom moves to the folded position.

According to a second aspect of the invention there is provided an agricultural machine for spreading particulate material across the ground comprising:

a center section including a tank for the material; and arranged for movement in a working direction across ground to receive the material;

a pair of booms each mounted on the center section so as to extend from the center section outwardly to a respective side of the center section, each boom having a plurality of material transportation pipes each having at least one discharge opening arranged so that the discharge openings are at spaced positions along the length of the boom;

a fan for generating an air flow through the pipes and a metering device for transferring the material from the tank to the pipes for discharge over the ground;

each boom being supported separately on the center section by:

an inner pivot member defining a horizontal pivot axis substantially at right angles to the boom allowing upward and downward pivoting movement of an outer end of the boom relative to the center section; and an inclined support member having an inner end at the center section at a height above the boom and at an outer end connected to the boom at a position thereon spaced outwardly from the center vehicle section such that weight from the boom is transmitted to the center section through the support member; and a suspension for the inner end of the support member including:

a first member connected to the center section;

a lever pivotally mounted at a first end of the lever on the first member and connected at a second end to the support member such that movement of the support member causes pivotal movement of the lever relative to the first member;

a compressed gas bag spring connected between the lever and the first member at a position part way along the lever between the first end and the second end and arranged so as to apply a spring force to the support member in a direction tending to raise the boom so as to provide resilient suspension movement of the boom;

and means for changing a gas pressure inside the gas bag spring so as to cause pivotal movement of the lever and to raise and lower a height of an outer end of the boom relative to the center vehicle section.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
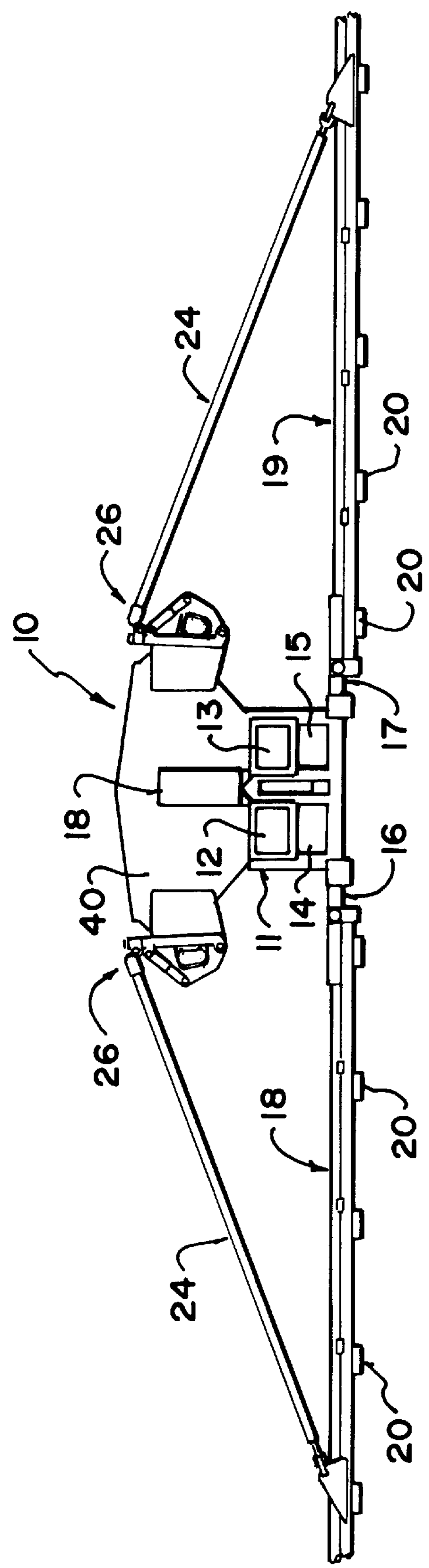
FIG. 1 is a rear elevational view of a machine for distributing particulate materials including a boom construction according to the present invention.
Figure 2:
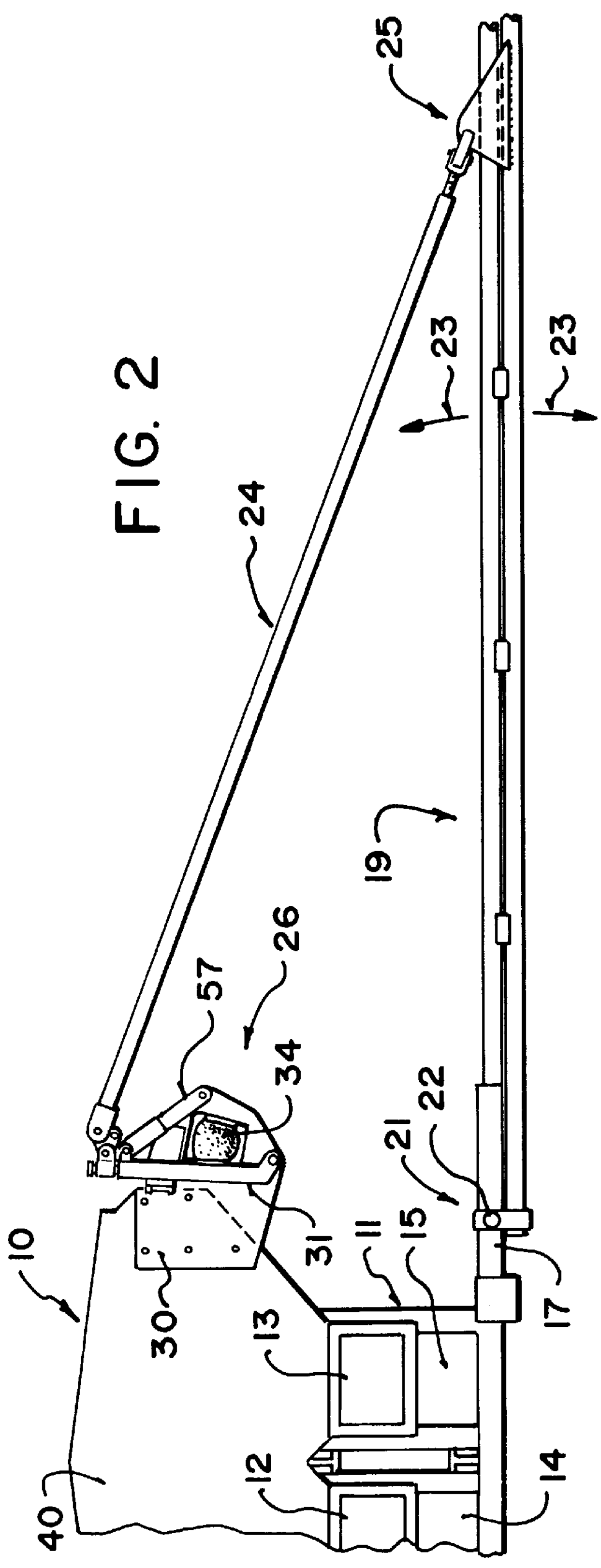
FIG. 2 is a similar rear elevational view showing a part only of the machine on an enlarged scale.
Figure 3:
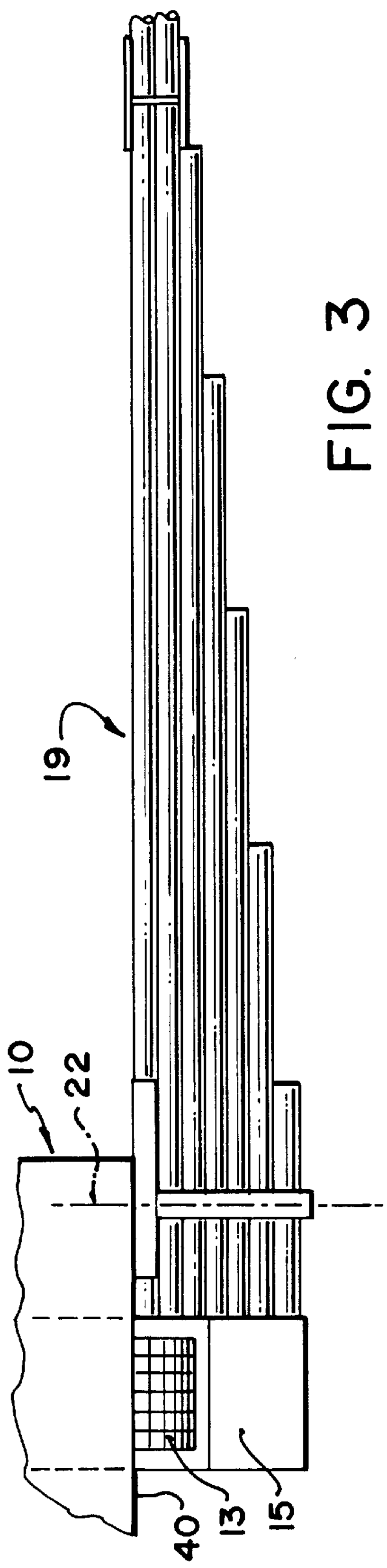
FIG. 3 is a top plan view of the part shown in FIG. 2.

Reference is made to the above mentioned U.S. Pat. No. 5,052,627 of the present inventor and the brochure of Ag-Chem showing the machine manufactured in accordance with the principles in the patent since these documents and the machine itself are available to the public and show most details of the machine illustrated in FIG. 1. The details of the tank, the construction of the boom, the metering and distribution system from the tank to the boom and the folding action of the boom of the present machine are therefore substantially identical to those shown in the above documents and in the above machine. These aspects will therefore be described only briefly herein and reference can be made to these documents and to the machine for further details as required.

The present invention is concerned with the suspension for the boom which allows the inclined support strut of the boom to move along its length to accommodate vertical suspension movements of the boom. In the above machine this movement is provided by a generally horizontal sway bar which is removed in the present invention and replaced by the boom suspension system described in detail hereinafter.

The machine therefore comprises a tank 10 carried on a support frame 11 arranged to be mounted on a transportation vehicle by which the tank can be transported across the ground for distribution of a particulate material contained in the tank over the ground. The support vehicle is not shown since this is well known to one skilled in the art and can be the same vehicle as is used for the machine described above.

The tank 10 and the frame 11 thus form a center section for the machine which is attached to the vehicle readily for transportation therewith. The center section further includes two transportation and metering belts 12 and 13 which withdraw the particulate material from the interior of the tank and carry that material to a pair of distribution guides 14 and 15 which distribute the metered material from the tank into a plurality of tubes. The tubes are divided into two sets including a first set 16 on one side of the machine and a second set 17 on the opposite side of the machine. A fan 18 generates an air flow which is supplied to a manifold between the two sets 16 and 17 so that air from the fan is directed by the manifold into the sets of tubes through a venturi system which withdraws the metered particulate material into the tubes for transportation along the tubes.

The machine further includes two booms 19 attached to the center section and extending outwardly to respective sides of the center section. Each boom is formed from a plurality of parallel connected pipes which are arranged to align with the pipes 16, 17 so that the material from the pipes 16, 17 is transmitted to the pipes of the boom and thus is carried by the pipes to respective discharge nozzles 20 at spaced positions along the length of the booms.

Each boom is mounted upon a support structure generally indicated at 21 for pivotal movement about a horizontal pivot axis 22. The support structure is fixed to the center section so that the pivotal movement of the boom about the axis 22 causes the outer end of the boom to move vertically upwardly and downwardly as indicated at 23. The pipes of the boom lie in a common horizontal plane adjacent to the axis 22.

The boom is supported on an inclined strut 24 which extends from a support element 25 on the boom to a suspension system 26. In general the suspension system 26 is attached to the center section of the machine at a position above the boom and a support 25 is attached to the boom at a position spaced outwardly from the center section so that the strut 24 is inclined outwardly and downwardly to communicate loads from the boom longitudinally of the strut to the center section.

In the arrangement shown there is only a single strut 24 but in an alternative arrangement there can be two such struts with a second strut inclined downwardly at a sharper angle than the strut 24 so that it meets the boom at a position spaced inwardly of the support 25.

The above arrangement is conventional and is shown in the above mentioned documents and available on the above mentioned machine. The improvement with which the present invention is concerned is that of providing an improved suspension arrangement which absorbs shock loads on the boom caused by sharp changes in ground height which are communicated from the boom longitudinally of the strut 24 to the suspension system 26.

Figure 4:
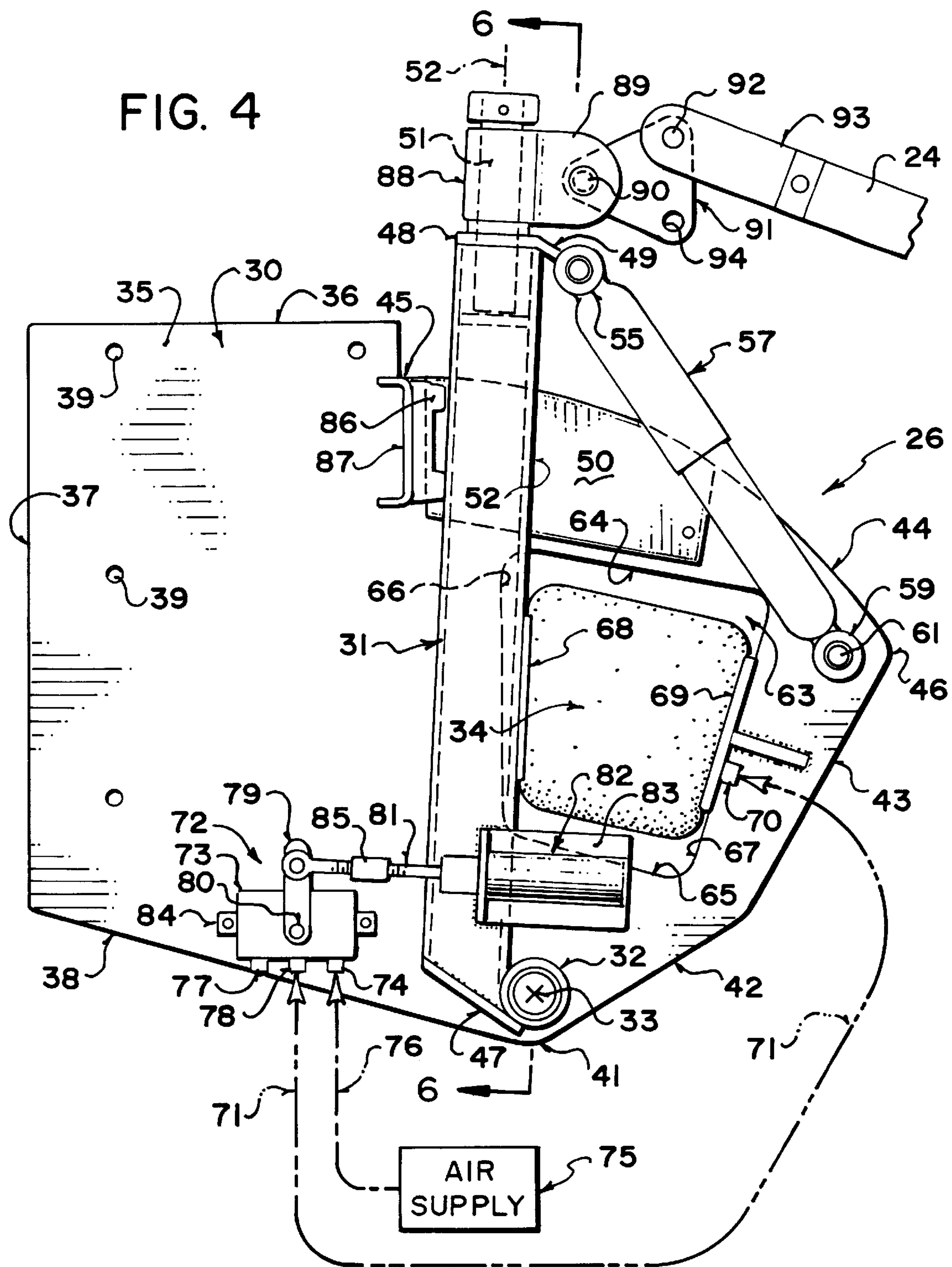
FIG. 4 is a rear elevational view of the boom suspension portion only of FIG. 1.
Figure 5:
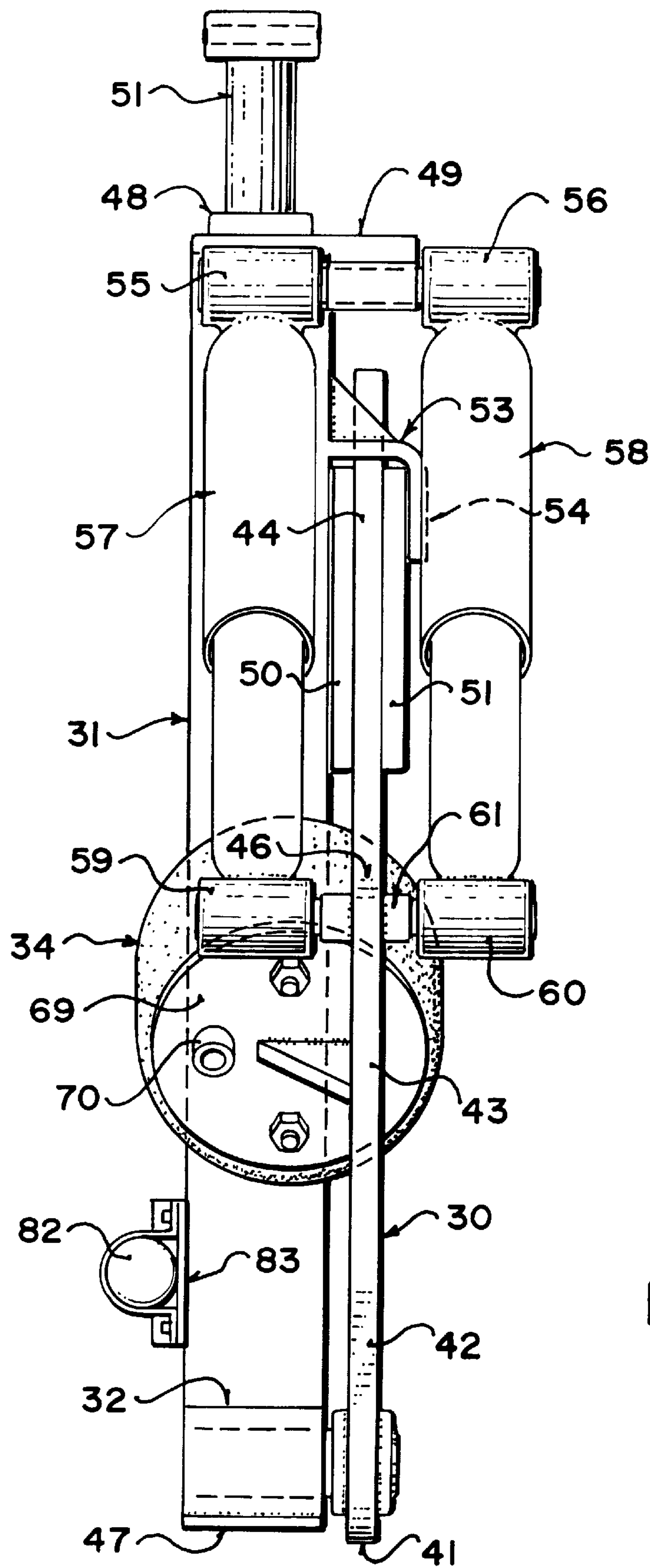
FIG. 5 is a side elevational view of the boom suspension portion of FIG. 4.
Figure 6:
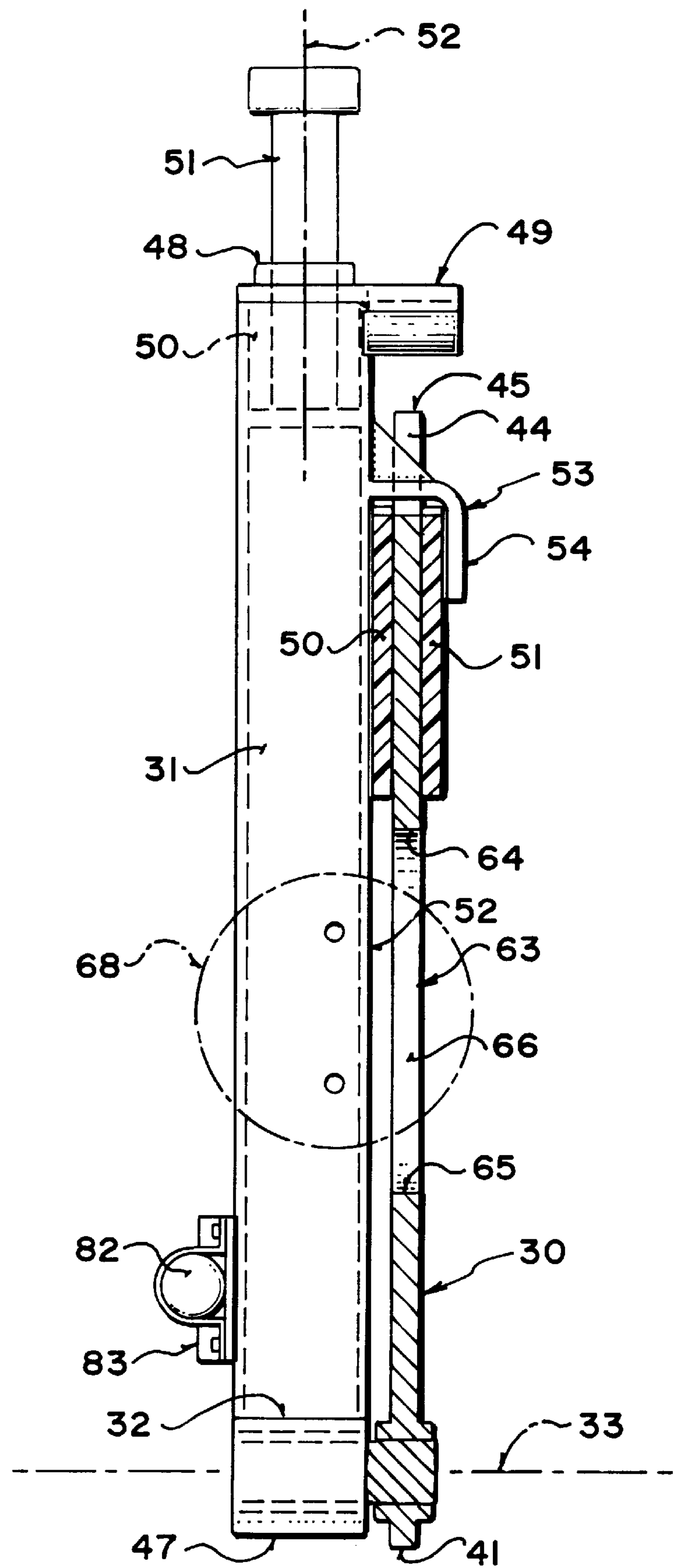
FIG. 6 is a cross sectional view along the lines 6—6 of FIG. 4.

The suspension system 26 is shown in more detail in FIGS. 4, 5 and 6.

The suspension system 26 comprises a first member 30 which is attached to the tank 10 in the form of a flat plate. A pivot arm 31 is mounted on the plate 30 for pivotal movement on a bushing 32 about a horizontal axis 33. The strut 24 is attached to an upper end of the pivot arm so that forces from the boom longitudinal of the strut are applied to the upper end of the pivot arm tending to pull it outwardly and downwardly against spring pressure provided by a gas bag spring 34.

In more detail, the plate 30 includes an attachment portion 35 having a top edge 36, an inner edge 37 and a bottom edge 38. A series of holes 39 allow the plate to be bolted to a rear wall 40 of the tank 10 so that the plate lies parallel to the rear wall and projects outwardly to a respective side of the tank at right angles to the side wall of the tank and at right angles to the direction of forward movement of the tank.

The bottom edge 38 is inclined downwardly and outwardly to a bottom apex 41 of the plate. The plate further includes an outer support section which projects outwardly from the side wall of the tank and has an upwardly and outwardly inclined bottom edge 42, an upwardly and outwardly inclined side edge 43 and an arcuate top edge 44. The arcuate top edge starts at an inner end 45 adjacent to the side wall of the tank and from that point extends downwardly and outwardly to an apex 46 at the junction between the side edge 43 and the top edge 44. The apex 46 is approximately halfway up the support portion of the plate 30.

The pivot arm 31 comprises a tubular member with a mounting plate 47 welded to the lower end of the tubular member and extending beyond one side of a tubular member for attachment to the bushing 32. At the upper end, the tubular member is closed by a top plate 48 which includes a tab piece 49 extending out to one side of the pivot arm. Within the upper end of the tubular member is provided a bushing 50 which supports a shaft 51 allowing rotation of the shaft about a longitudinal axis 52*a* of the pivot arm. Thus the pivot arm is straight from its lower end at the bushing 32 through to an upper end of the shaft 51.

On each side of the plate 30 at the top edge 44 is provided a respective one of a pair of rub-plates 50 and 51 with the rub-plates having an upper edge projecting slightly beyond and following the upper edge 44 on the plate 30 and the rub plates covering a part of the plate 30 from the upper edge 45 over an intended range of movement of the pivot arm 31. Thus one side surface 52 of the tubular member of the pivot arm rubs against the adjacent rub plate 50. Adjacent the top end of the tubular member is provided an angle member 53 which is welded at an inner end to the side 52 of a tubular member and projects outwardly therefrom to define a flange 54 extending parallel to the face 52 for engaging the rub plate 51. The pivot arm 31 is thus confined in pivotal movement to follow the plane of the plate 30 guided by its engagement with the rub plates. The rub plates thus absorb any tendency of the pivot arm to move away from the plane of the plate 30 due to for and aft forces from the boom onto the pivot arm.

The tab piece 49 carries a pair of attachment brackets 55 and 56 each of which connects to an upper end of a respective one of a pair of shock absorbers 57, 58 which extend from the pivot arm 30 at the tab piece 49 to a similar pair of brackets 59, 60 attached to a shaft 61 carried on a plate 30. Thus the shock absorbers act to provide an energy absorption dampening effect to dampen pivotal movement of the pivot arm relative to the plate.

The plate 30 has a central hole 63 having a top edge 64, a bottom edge 65, a first side edge 66 adjacent the mounting portion 35 and a second side edge 67 adjacent the side edge 43. The side edge 66 is substantially vertical so that it is parallel to the side face of the pivot arm when the pivot arm is in the ranged position. The side edge 67 is inclined upwardly and outwardly so that it is substantially parallel to the side face 52 of the pivot arm when it is moved to an outward pivoted position adjacent the extent of the rub plates 50 and 51.

A circular plate 68 is attached to the side face 52 of the pivot arm. A similar circular plate 69 is attached to the side edge 67 of the openings 63 and these circular plates define mounts for the gas bag spring 34.

The gas bag spring is of a conventional nature readily commercially available and providing a different spring characteristics at different air pressures. Suitable examples for the gas bag spring will be well known to one skilled in the art.

Air pressure to the gas bag is supplied from a nipple 70 on the plate 69. The nipple 70 is connected to a supply hose 71 communicating from a control switch 72. The control switch 72 comprises a switch body 73 with a first inlet 74 for air from a suitable supply 75 through a hose 76. The switch body provides a nozzle 77 which acts as a discharge outlet for merely venting air pressure. The supply line 71 is connected to a nozzle 78. An actuation lever 79 can be pivoted about a pivot pin 80 toward the nozzle 77 and away from the nozzle 74 and in the opposite direction toward the nozzle 74 and away from the nozzle 77. These pivotal movements effect operation of a valve within the switch body so that when the lever is moved toward the nozzle 77, the nozzle 78 is connected through the nozzle 77 allowing venting of air pressure from the gas bag spring. When the lever is moved toward the nozzle 74, air pressure from the supply 75 is supplied to the gas bag spring via the valve within the switch body.

The lever 79 is connected through an arm 81 and a solenoid actuator 82 to the pivot arms 30. More particularly, the solenoid 82 is mounted on a support plate 83 carried on a side of the tubular member. The switch body 73 is mounted on the plate 30 at the mounting portion 35 by tabs and bolts 84. The rod 81 includes an adjustment member 85 operable to vary the length of the rod. The solenoid actuator 82 has two positions including an extended position and a retracted position.

The side surface of the pivot arm in the uppermost position of the pivot arm engages a rubber bumper 86 carried on a plate 87 attached to the side of the plate 30. The bumper thus acts as an end stop and absorbs energy in the event that the pivot arm pivots rapidly in a counterclockwise direction as shown.

On the shaft 51 is mounted a collar 88 which can rotate with the collar about the axis 52. The collar includes a vertical flange 89 projecting outwardly to one side of the shaft 51 to which is attached a pin 90 carrying a triangular plate 91. The pin 90 is arranged at one apex of the triangular plate and the plate stands outwardly from the flange 89 in a plane parallel thereto so that the triangular plate can pivot about the horizontal axis of the pin. The strut 24 is connected to the triangular plate by a pin 92 passing through one apex which carries a swivel coupling 93 allowing some twisting of the strut 24 about its longitudinal axis. The triangular plate is provided to allow coupling of a second strut to the hole 94 at the third apex and the triangular plate automatically accommodates the forces from the two struts which can vary due to bending of the boom.

In operation, with the boom supported on its pivot 21 for rotation about the pivot axis 22, the weight from the boom is communicated through the strut or the struts to the collar 88 at the top of the shaft 51. The weight from the boom thus tends to rotate the pivot arm 31 about its axis 33 thus compressing the gas spring 34. The adjustment member 85 is turned so as to increase or decrease the length of the rod 81 allowing the pivot arm to rotate to a position in which the boom is at a required angle relative to a horizontal plane through the horizontal pivot axis 33. In practice the boom is arranged to be approximately 4° above horizontal. With the length of the rod so adjusted, the switch 72 acts as a self-leveling switch in the sense that it varies the air pressure in the gas bag spring so as to tend to maintain the boom at this predetermined angle. In practice, therefore, in the event that the boom moves upwardly relative to the center section due to a change in ground level moving the center section downwardly, the pivot arm 31 rotates about the axis 33 and the counterclockwise direction against the resistance of the shock absorbers and expanding the spring. The shock absorbers act generally in parallel to the spring. This movement also acts to push the lever 79 to the left so that pressure is released from the gas bag spring to the vent 77. In this way the gas bag pressure is reduced allowing the pivot arm to rotate in the clockwise direction.

In the event that the boom moves downwardly that is a center section again due to a change in ground height, this downward movement is communicated to the gas bag spring through the pivot arm 30 so that the spring acts as a resistance that allows further compression of the spring thus providing a spring resilience to the shock loads on the boom. In the opposite action to that previously described this downward movement causes the lever 79 to move to the right thus acting to supply air from the air supply 75 to the gas bag spring tending to increase the gas bag spring.

It is also possible that the switch 72 can include a delay which avoids changing the pressure until the movement of the boom has been in effect for a period longer than the set delay period. If this delay is adopted, the changes in pressure will therefore not be effected simply by suspension movements but will be effected by longer term movements. Longer term movements can be caused by changes in orientation or tilting of the center section and also by halting or commencing the feed of the materials through the pipes.

Whether or not the delay option is utilized, the gas bag spring acts to provide spring resilience to the shock loads on the boom. In addition the gas bag spring provides a self leveling effect tending to maintain the boom at the set height.

Actuation of the solenoid from an extended position to a retracted position acts to move the lever 79 to the right thus actuating the self leveling effect at a different set position causing the application of additional air pressure to the gas bag spring to push the pivot arm 30 in the counter clockwise direction to the fully raised position shown in FIG. 4. In the fully raised position, actuation of the folding action of the boom can be effected in the manner of the machine shown in the prior documents. When the folding action occurs, the boom is necessary therefore in the raised position and its orientation relative to the pivot axis 33 is necessarily set to ensure that the boom moves in the folding action to a predetermined set position. The height of the boom is adjusted therefor without in any way varying the length of the strut 24 which is simply a fixed length, subject to some minor adjustments for manufacturing tolerances.

The support plate and the pivot arm act as guides to control the direction of movement of the strut so that the movement is guided along the plane of the plate. The gas bag spring therefore simply acts to provide resilience for the movement since it does not and cannot provide guiding action. In addition the lever is arranged relative to the position of the gas bag spring so as to provide a mechanical advantage. The position of the gas bag spring therefore can be arranged so that its range of movement is within the operating parameters of the gas bag spring for example in the range 4 to 10 inches from compressed length to extended length. The same mechanical advantage also places the load from the boom in the usable range of forces to be accommodated by the gas bag spring.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An agricultural machine for spreading particulate material across the ground comprising:

a center section including a tank for the material; and arranged for movement in a working direction across ground to receive the material;

a pair of booms each mounted on the center section so as to extend from the center section outwardly to a respective side of the center section, each boom having a plurality of material transportation pipes each having at least one discharge opening arranged so that the discharge openings are at spaced positions along the length of the boom;

a fan for generating an air flow through the pipes and a metering device for transferring the material from the tank to the pipes for discharge over the ground;

each boom being supported separately on the center section by:

an inner pivot member defining a horizontal pivot axis substantially at right angles to the boom allowing upward and downward pivoting movement of an outer end of the boom relative to the center section; and an inclined support member having an inner end at the center section at a height above the boom and at an outer end connected to the boom at a position thereon spaced outwardly from the center section such that weight from the boom is transmitted to the center section through the support member; and a guide assembly guiding movement of the inner end of the support member relative to the center section in a direction generally longitudinal of the support member to allow said pivoting movement;

a compressed gas bag spring arranged so as to apply a spring force to the support member in a direction tending to raise the boom so as to provide resilient suspension movement of the boom.

2. The machine according to claim 1 including means for changing a gas pressure inside the gas bag spring so as to raise and lower a height of an outer end of the boom relative to the center vehicle section.

3. The machine according to claim 2 including a self leveling switch responsive to changes in angle and to adjust the gas pressure in the gas bag spring to tend to maintain the angle of the boom relative to the center section at a predetermined operating height of the boom value while the gas bag spring allows said suspension movements of the boom relative to the center vehicle section.

4. The machine according to claim 2 including a manually operable switch and an actuator arranged so as to effect a change in the gas pressure in the gas bag spring to raise the boom from a predetermined operating height to a raised height.

5. The machine according to claim 3 including a manually operable switch and an actuator responsive to the switch for moving the self-leveling switch to raise the boom from a predetermined operating height to a raised height.

6. The machine according to claim 1 including at least one shock absorber arranged so as to operate generally in parallel to the gas bag spring for damping said resilient suspension movements.

7. The machine according to claim 1 wherein the support member comprises at least one substantially rigid strut such that the strut is arranged to communicate forces to the boom from the center vehicle section both in tension and compression.

8. The machine according to claim 7 including means for changing a gas pressure inside the gas bag spring so as to raise and lower a height of an outer end of the boom relative to the center section from a pre-determined operating height to a raised height and wherein the strut is of substantially constant length such that the adjustment of the height of the boom is effected by only changing said gas pressure.

9. The machine according to claim 1 wherein the guide assembly includes a first member connected to the center section and a lever pivotally mounted at a first end of the lever on the first member and a second end connected to the support member.

10. The machine according to claim 9 wherein the gas bag spring is connected between the lever and the first member.

11. The machine according to claim 10 wherein the gas bag spring is located at a position part way along the lever between the first end and the second end.

12. The machine according to claim 10 wherein the lever is pivotal about an axis parallel to said horizontal pivot axis and stands generally upwardly with the pivot connection at the lower end and the support member connected to the upper end.

13. The machine according to claim 9 wherein the first member defines a vertical guide surface against which the lever slides.

14. The machine according to claim 12 wherein the first member comprises a substantially vertical support plate attached to and extending outwardly to one side of the tank and wherein the lever is mounted for pivotal movement about a horizontal axis at right angles to the support plate.

15. The machine according to claim 14 wherein the support plate has an opening therein with the gas bag spring located in the opening with one end attached to an end engagement plate mounted on the support plate at right angles to the support plate.

16. The machine according to claim 9 wherein the support member is connected to the lever for pivotal movement about an axis generally longitudinal of the lever for movement of the boom to a folded position.

17. The machine according to claim 16 wherein the first member and the lever are fixed to the center section to remain extending to one side of the center section while the boom moves to the folded position.

18. An agricultural machine for spreading particulate material across the ground comprising:

a center section including a tank for the material; and arranged for movement in a working direction across ground to receive the material;

a pair of booms each mounted on the center section so as to extend from the center section outwardly to a respective side of the center section, each boom having a plurality of material transportation pipes each having at least one discharge opening arranged so that the discharge openings are at spaced positions along the length of the boom;

a fan for generating an air flow through the pipes and a metering device for transferring the material from the tank to the pipes for discharge over the ground;

each boom being supported separately on the center section by:

an inner pivot member defining a horizontal pivot axis substantially at right angles to the boom allowing upward and downward pivoting movement of an outer end of the boom relative to the center section; and an inclined support member having an inner end at the center section at a height above the boom and at an outer end connected to the boom at a position thereon spaced outwardly from the center vehicle section such that weight from the boom is transmitted to the center section through the support member; and a suspension for the inner end of the support member including:

a first member connected to the center section;

a lever pivotally mounted at a first end of the lever on the first member and connected at a second end to the support member such that movement of the support member causes pivotal movement of the lever relative to the first member;

a compressed gas bag spring connected between the lever and the first member at a position part way along the lever between the first end and the second end and arranged so as to apply a spring force to the support member in a direction tending to raise the boom so as to provide resilient suspension movement of the boom;

and means for changing a gas pressure inside the gas bag spring so as to cause pivotal movement of the lever and to raise and lower a height of an outer end of the boom relative to the center vehicle section.

* * * * *